(12) United States Patent
Tang et al.

(10) Patent No.: US 11,708,696 B2
(45) Date of Patent: *Jul. 25, 2023

(54) REDUCED WEIGHT, MULTI-LAYER ROOFING SHINGLES AND METHODS FOR INSTALLING THEM

(71) Applicant: CertainTeed LLC, Malvern, PA (US)

(72) Inventors: Xiaofeng Tang, Malvern, PA (US); Robert L. Jenkins, Honey Brook, PA (US)

(73) Assignee: CERTAINTEED LLC, Malvern, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/498,851

(22) Filed: Oct. 12, 2021

(65) Prior Publication Data

US 2022/0098864 A1 Mar. 31, 2022

Related U.S. Application Data

(63) Continuation of application No. 16/365,427, filed on Mar. 26, 2019, now Pat. No. 11,142,912.

(60) Provisional application No. 62/651,107, filed on Mar. 31, 2018.

(51) Int. Cl.
*E04D 1/26* (2006.01)
*E04D 1/22* (2006.01)
*B32B 3/08* (2006.01)
*E04D 1/00* (2006.01)
*B32B 7/12* (2006.01)

(52) U.S. Cl.
CPC .................. *E04D 1/26* (2013.01); *B32B 3/08* (2013.01); *B32B 7/12* (2013.01); *E04D 1/22* (2013.01); *B32B 2307/718* (2013.01); *B32B 2419/06* (2013.01); *E04D 2001/005* (2013.01)

(58) Field of Classification Search
CPC .... E04D 1/22; E04D 1/23; E04D 1/26; E04D 1/28; E04D 2001/005; B32B 2419/06
See application file for complete search history.

(56) References Cited

U.S. PATENT DOCUMENTS

| 1,619,601 | A | * | 3/1927 | Cumfer | ..................... E04D 1/26 52/555 |
| 2,064,473 | A | * | 12/1936 | Holdsworth | .............. E04D 1/26 52/557 |
| 3,624,975 | A | * | 12/1971 | Morgan et al. | ........... E04D 1/26 D25/139 |
| 5,950,387 | A | * | 9/1999 | Stahl | ........................ E04D 1/29 52/748.1 |

(Continued)

*Primary Examiner* — Christine T Cajilig
(74) *Attorney, Agent, or Firm* — McDonnell Boehnen Hulbert & Berghoff LLP

(57) ABSTRACT

One aspect of the disclosure is roofing shingle including a shim layer having a top surface, a first side edge, and a second side edge positioned opposite the first side edge. The roofing shingle also includes a top shingle layer at least partially laminated to the top surface of the shim layer, where the top shingle layer includes a first side edge offset a sidelap distance from the first side edge of the shim layer such that a side portion of the top surface of the shim layer is exposed, and a second side edge extending beyond the second side edge of the shim layer so as to overlap the second side edge of the shim layer by the sidelap distance.

21 Claims, 5 Drawing Sheets

(56) References Cited

U.S. PATENT DOCUMENTS

| | | | | |
|---|---|---|---|---|
| 6,105,329 | A * | 8/2000 | Bondoc | E04D 1/26 52/557 |
| 6,289,648 | B1 * | 9/2001 | Freshwater | D06N 5/00 52/518 |
| 7,510,622 | B2 * | 3/2009 | Kalkanoglu | B26D 5/34 156/289 |
| 7,678,991 | B2 * | 3/2010 | McCaskill | H02S 20/25 136/251 |
| 7,805,905 | B2 * | 10/2010 | Rodrigues | E04D 1/26 D25/139 |
| 8,240,100 | B2 * | 8/2012 | Kalkanoglu | E04D 1/26 52/518 |
| 10,174,504 | B1 * | 1/2019 | Freiborg | E04D 1/2918 |
| 10,180,001 | B2 * | 1/2019 | Leitch | E04D 1/26 |
| 2006/0260731 | A1 * | 11/2006 | Kalkanoglu | B26D 5/34 83/13 |
| 2016/0177569 | A1 * | 6/2016 | Leitch | E04D 1/26 52/559 |
| 2017/0175393 | A1 * | 6/2017 | Leitch | E04D 1/26 |

* cited by examiner

REDUCED WEIGHT, MULTI-LAYER ROOFING SHINGLES AND METHODS FOR INSTALLING THEM

CROSS-REFERENCE TO RELATED APPLICATIONS

This application is a continuation of U.S. patent application Ser. No. 16/365,427 filed Mar. 26, 2019, which claims the benefit of priority to U.S. Provisional Patent Application No. 62/651,107, filed Mar. 31, 2018, each of which is hereby incorporated herein by reference in its entirety.

BACKGROUND OF THE DISCLOSURE

1. Field of the Disclosure

The present disclosure relates generally to roofing shingles and methods for installing them. The present disclosure relates more particularly to multi-layered roofing shingles having a reduced weight.

2. Technical Background

The two most common types of bituminous (e.g., asphalt) roofing shingles are three-tab shingles and architectural or "laminated" shingles. Three-tab shingles are generally formed from a single bituminous sheet having an exposure zone and a headlap zone, with three distinct "tabs" defined by two elongated notches between the tabs. The notches extend from a bottom edge of the shingle, through at least part of the exposure zone toward the headlap zone. The shingles are laid in lateral rows on a roof in an edge-to-edge manner. To prevent the infiltration of water between the joints formed where the sides of two adjacent shingles meet, the exposure zones of an upper row of shingles are generally installed over the headlap zones of a lower row of shingles, in a repeating pattern where the joints are laterally staggered between rows.

Architectural shingles also generally include an exposure zone and a headlap zone. The exposure zone of an architectural shingle is typically composed of a top bituminous sheet that includes tabs (e.g., so-called "dragon's teeth") that cover respective portions of a continuous bottom bituminous sheet. The headlap zone is typically composed solely or mostly of the top bituminous sheet. The top and bottom sheets are laminated together to present a layered appearance. Due to their multi-layer composition, architectural shingles tend to be relatively heavier than three-tab shingles per square foot of roof coverage.

Accordingly, what is needed is an improved architectural roofing shingle that provides a layered appearance while having a lower overall shingle weight.

SUMMARY OF THE DISCLOSURE

One aspect of the disclosure is a roofing shingle having a headlap zone disposed above an exposure zone, the roofing shingle including:
a shim layer having a top edge, a bottom edge disposed in the exposure zone, a top surface, and a connecting portion adjoining the top edge and connecting a series of tabs, wherein the series of tabs includes a series of gaps separating adjacent tabs in the series of tabs, wherein each gap in the series of gaps extends lengthwise from the bottom edge of the shim layer to the connecting portion;
a top shingle layer at least partially laminated to the top surface of the shim layer, wherein the top shingle layer comprises a top edge disposed in the headlap zone, a bottom edge disposed in the exposure zone, a headlap portion adjoining the top edge and connecting a series of dragon's teeth, wherein the series of dragon's teeth includes a series of spaces separating adjacent dragon's teeth in the series of dragon's teeth, wherein each spaces in the series of spaces extends lengthwise from the bottom edge of the top shingle layer to the headlap portion, and wherein the shim layer and the top shingle layer are aligned such that each dragon's tooth in the series of dragon's teeth covers a corresponding gap in the series of gaps Another aspect of the disclosure is a roofing shingle system comprising:
a first plurality of roofing shingles as described herein, wherein the first plurality of roofing shingles are arranged laterally edge to edge to form a first course; and
a second plurality of roofing shingles as described herein, wherein the second plurality of roofing shingles are arranged laterally edge to edge to form a second course, wherein the second course of roofing shingles overlaps the headlap zones of the shingles of the first course of roofing shingles.

Another aspect of the disclosure is a roof comprising a roof deck having an upper end and a lower end, and the roofing shingle system as described herein fastened thereto, wherein the headlap zones of the roofing shingles are disposed toward the upper end of the roof deck and the exposure zones of the roofing shingles are disposed toward the lower end of the roof deck.

Another aspect of the disclosure is a method for installing a roof as described herein. The method includes:
fastening the first plurality of the roofing shingles to the roof deck in a laterally edge-to-edge manner to form a first course, and
fastening the second plurality of the roofing shingles to the roof deck in a laterally edge-to-edge manner to form a second course, disposed such that the second course of roofing shingles overlaps the headlap zones of the roofing shingles of the first course of roofing shingles.

Another aspect of the disclosure is a method for making a roofing shingle as described herein. The method includes:
applying a laminating adhesive to the top surface of the shim layer, wherein the laminating adhesive is applied lengthwise along a first side edge and a second side edge of each tab in the series of tabs;
positioning the top shingle layer in contact with the top surface of the shim layer such that each dragon's tooth in the series of dragon's teeth covers a corresponding gap in the series of gaps; and
at least partially laminating the top shingle layer to the top surface of the shim layer.

Additional aspects of the disclosure will be evident from the disclosure herein.

BRIEF DESCRIPTION OF THE DRAWINGS

The accompanying drawings are included to provide a further understanding of the methods and devices of the disclosure, and are incorporated in and constitute a part of this specification. The drawings are not necessarily to scale, and sizes of various elements may be distorted for clarity. The drawings illustrate one or more embodiment(s) of the disclosure, and together with the description serve to explain the principles and operation of the disclosure.

DETAILED DESCRIPTION

The present inventors have noted disadvantages of conventional roofing shingles. In particular, conventional architectural shingles that generally have at least two shingle layers use more material and are relatively heavier than traditional three-tab shingles per square foot of roof area. This contributes to architectural shingles being more expensive to manufacture, as well as adding to the anticipated loads that must be carried by the roof deck.

The present inventors have noted that, in conventional architectural shingles that include a dragon's teeth arrangement of the top shingle layer, the portions of the continuous bottom bituminous sheet, sometimes referred to as the shim layer, that are positioned beneath the dragon's teeth may not be necessary. Rather, the portion of the shim layer that is positioned beneath the dragon's teeth may be removed without substantially altering the appearance or performance of the roofing shingle. Consequently, the amount of material required to form the shim layer may be reduced, and thus the overall weight of the roofing shingle may be reduced as well.

Accordingly, one aspect of the disclosure is a multi-layer roofing shingle having a shim layer that includes a series of tabs separated by a series of gaps, where each tab in the series of tabs is positioned in the space between adjacent dragon's teeth of the top shingle layer. The top shingle layer and shim layer may be laminated together in this arrangement, reducing the overall weight of the roofing shingle via the reduction of material used for the shim layer.

Figure 1:
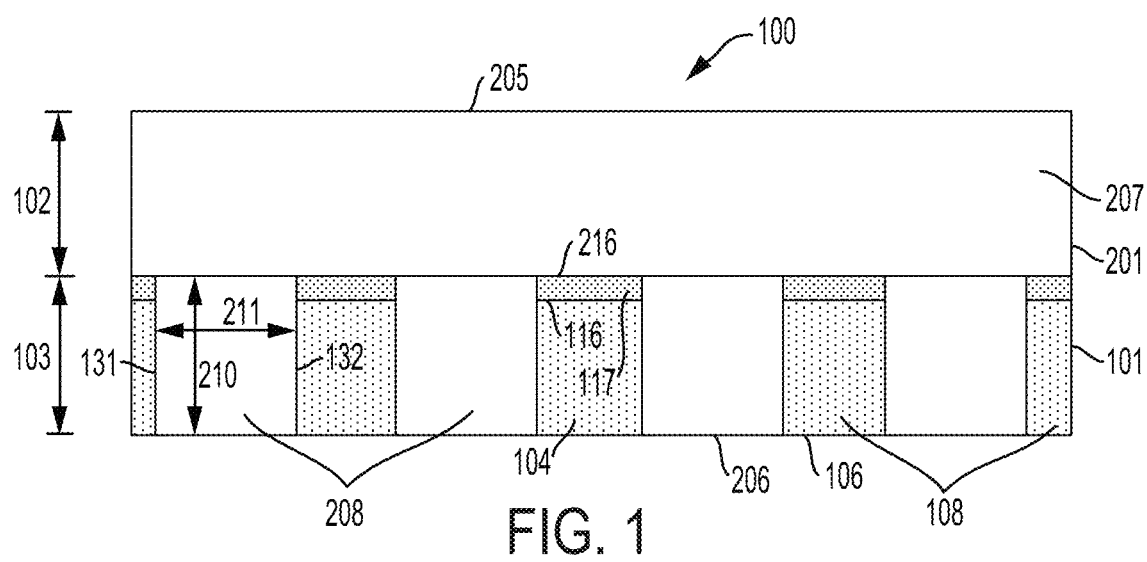
FIG. 1 is a schematic plan view of a roofing shingle according to one embodiment of the disclosure.

One embodiment of such a roofing shingle is described with respect to FIGS. 1-3 below. FIG. 1 shows a multi-layer roofing shingle 100 with a headlap zone 102 disposed above an exposure zone 103. The roofing shingle 100 is composed of a shim layer 101 and top shingle layer 201, which are shown separately in FIGS. 2 and 3, respectively. As can be seen with reference to both FIGS. 1 and 3, the top shingle layer 201 includes a top edge 205 disposed in the headlap zone 102 of the roofing shingle 100, and a bottom edge 206 disposed in the exposure zone 103 of the roofing shingle 100.

The top shingle layer 201 further includes a headlap portion 207 adjoining the top edge 205 and connecting a series of so-called dragon's teeth 208 that extend from the headlap portion 207 of the top shingle layer 201. The series of dragon's teeth 208 may include a series of spaces 209 separating adjacent dragon's teeth 208 in the series of dragon's teeth 208. In some cases, at either end of the top shingle layer 201, where the roofing shingle 100 may be abutted against another roofing shingle 100, the next adjacent dragon's tooth 208 may be on the adjacent roofing shingle. As can be seen in FIGS. 1 and 3, each space 209 in the series of spaces 209 extends lengthwise from the bottom edge 206 of the top shingle layer 201 to the headlap portion 207.

The roofing shingle 100 also includes a shim layer 101, which in FIG. 1 is positioned beneath the top shingle layer 201. Referring also to FIG. 3, the shim layer 101 includes a top edge 105, and a bottom edge 106 disposed in the exposure zone of the roofing shingle 100, and a top surface 104. Similar to the top shingle layer 201, the shim layer 101 may include a connecting portion 107 adjoining the top edge 105 and connecting a series of tabs 108. Further, the series of tabs 108 may include a series of gaps 109 separating adjacent tabs 108 in the series of tabs 108. Like the spaces 209 of the top shingle layer 201, the series of gaps 109 may extend lengthwise from the bottom edge 106 of the shim layer 101 to the connection portion 107.

As can be seen from a comparison of FIGS. 2 and 3, the shim layer 101 and the top shingle layer 201 have a similar arrangement, although their respective elements are positioned in opposition to each other, as further discussed below. Accordingly, in some cases, the dragon's teeth 208 of the top shim layer 201 might additionally or alternatively be referred to as tabs, and the spaces 209 referred to as gaps. The opposite may also be possible, as the tabs 108 of the shim layer 101 might be referred to as dragon's teeth, and the gaps 109 referred to as spaces. However, for purposes of clarity in referring to the two layers of the roofing shingle 100, the naming convention established above with respect to the Figures will be used throughout this disclosure.

As shown in FIG. 1, the top shingle layer 201 may be aligned with the shim layer 101 such that each dragon's tooth 208 in the series of dragon's teeth 208 on the top shingle layer 201 covers a corresponding gap 109 in the series of gaps 109 on the shim layer 101. For example, the top shingle layer 201 may be partially laminated to the top surface 104 of the shim layer 101 in this position. In some implementations, a laminating adhesive may be used, which will be discussed further below.

In this way, the amount of material used for the shim layer 101 may be reduced, and thus the roofing shingle 100 may be cheaper to manufacture than a traditional multi-layer roofing shingle with a continuous shim layer. Further, the total weight of the roofing shingle 100 may be reduced, which may reduce the dead load that must be carried by the roof deck. Moreover, the roofing shingle 100 may provide these and other benefits while providing similar performance as a traditional multi-layer roofing shingle. For instance, the visual appearance of the roofing shingle 100, as seen in the plan view of FIG. 1, may be substantially similar to or the same as the plan view of a shingle in which the shim layer is a continuous mat that does not include the gaps 109. Further, the roofing shingle 100 may have the same or substantially the same effectiveness at shedding water as a traditional multi-layer roofing shingle.

Conventional shingle materials can be used in the roofing shingles of the present disclosure. In some examples, the shim layer 101 and the top shingle layer 201 may be formed from the same material. For example, the shim layer 101 and the top shingle layer 201 may be formed from respective fiberglass or felt mats that are coated with a bituminous coating (e.g., asphalt) and weather-resistant roofing granules. Such mats may be formed with other conventional materials known to one of ordinary skill in the art as well. Further, the shim layer 101 may have a thickness that is equal to a thickness of the top shingle layer 201. For instance, the thickness of each layer may be ¼ of an Inch or Less, e.g., ⅛ of an Inch or Less, or 1/16 of an inch or less. In some cases, the shim layer 101 and the top shingle layer 201 may be cut from the same sheet. In other examples, the shim layer 101 and the top shingle layer 201 may have different thicknesses, or may be formed from different materials.

In some implementations, such as the example shown in FIG. 1, the bottom edge 106 of the shim layer 101 may be substantially coextensive with the bottom edge 206 of the top shingle layer 201. This may give the bottom of the roofing shingle 100 a relatively straight appearance. In other embodiments, the bottom edge 206 of the top shingle layer 201 may be offset from the bottom edge 106 of the shim layer 101. For instance, the bottom edge 105 of the shim layer 101 may extend beyond the bottom edge 206 of the top shingle layer 201. An example of this configuration can be seen in FIG. 4, which will be discussed further below. As another example, the bottom edge 206 of the top shingle layer 201 may extend beyond the bottom edge 106 of the shim layer 101.

Further, the examples above assume that each tab 108 in the series of tabs 108 has the same length 110, and that each dragon's tooth 208 in the series of dragon's teeth 208 has the same length 210, which may be the case in some embodiments. However, in some implementations, the lengths of the tabs 108 or the dragon's teeth 208, or both, may be varied in order to introduce a more random patter to the roofing shingle 100. This may more accurately simulate the appearance of a traditional cedar shake roof, which may be desirable in some situations.

For example, each tab 108 in the series of tabs 108 may include a first length 110 that is different from a second length of at least one adjacent tab 108, either to the right or left, in the series of tabs 108. Similarly, each dragon's tooth 208 in the series of dragon's teeth 208 may include a first length 210 that is different from a second length of at least one adjacent dragon's tooth 208, either to the right or left, in the series of dragon's teeth 208. In this way, the bottom edge 106 of the shim layer 101 or the bottom edge 206 of the top shingle layer 201, or both, may not be a straight line. Consequently, in a given roofing shingle 100, the respective lengths of the tabs 108 and the dragon's teeth 208 may include any combination of the arrangements discussed above.

Figure 2:
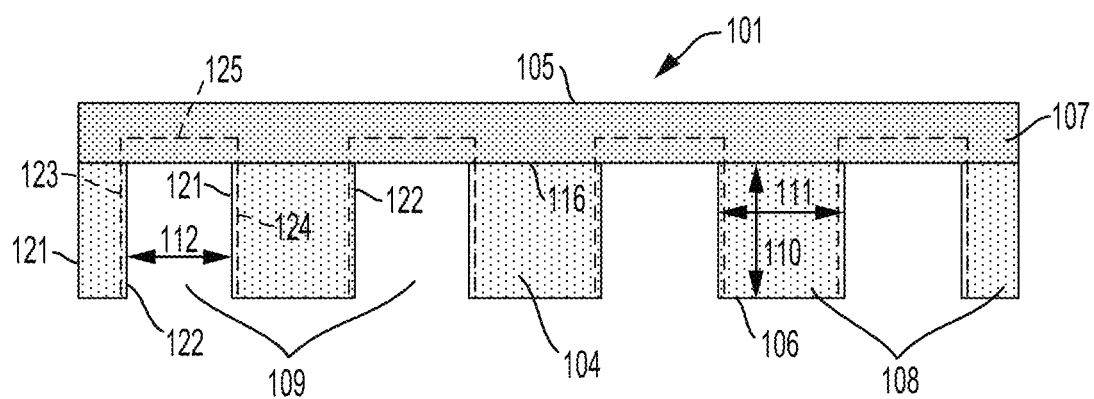
FIG. 2 is a schematic plan view of a shim layer of a roofing shingle according to one embodiment of the disclosure.
Figure 3:
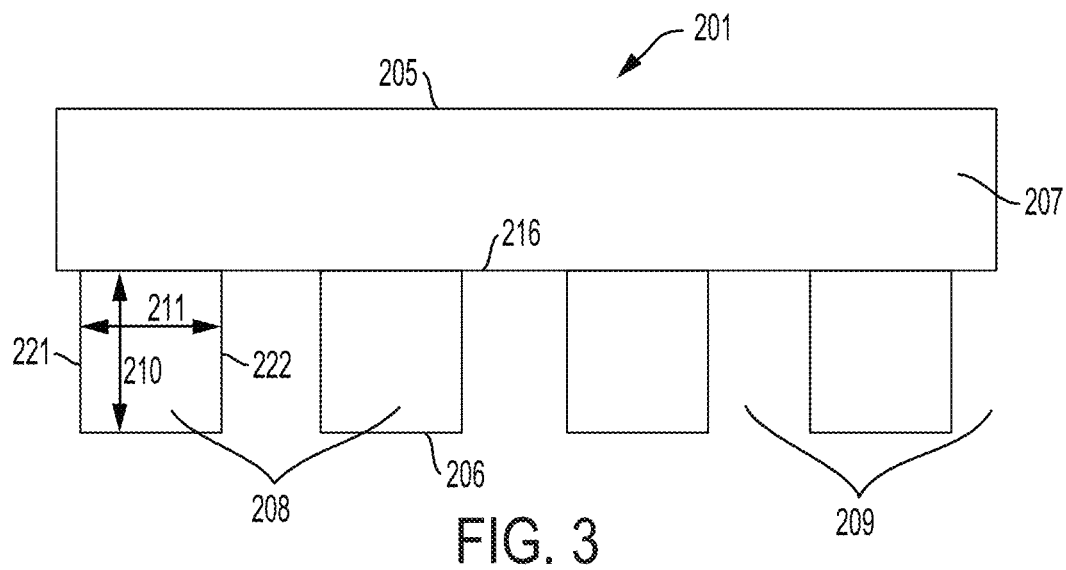
FIG. 3 is a schematic plan view of a top shingle layer of a roofing shingle according to one embodiment of the disclosure.

As can be seen in FIG. 2, the connecting portion 107 of the shim layer 101 may include a bottom edge 116. Further, the connecting portion 107 may be colored a darker shade from the tabs 108, in order to create a shadow line along the bottom edge 116. The headlap portion 207 of the top shingle layer 201 may also include a bottom edge 216, as seen in FIG. 3. In some embodiments as otherwise described herein, the bottom edge 116 of the connecting portion 107 may be offset from the bottom edge 216 of the headlap portion 207. In this way, a portion 117 of the connecting portion 107 may be exposed, including the shadow line along the bottom edge 116, as can be seen in the roofing shingle 100 shown in FIG. 1. This may simulate a greater thickness of the headlap portion 107, as it may appear to cast a shadow on the tabs 108 below.

As discussed above, each dragon's tooth 208 in the series of dragon's teeth 208 on the top shingle layer 201 covers a corresponding gap 109 in the series of gaps 109 on the shim layer 101. For example, as shown in FIG. 3, each dragon's tooth 208 in the series of dragon's teeth 208 may include a first side edge 221 and a second side edge 222 defining a first width 211 therebetween. The first width 211 of the dragon's tooth 208 may be greater than a second width 112 of the corresponding gap 109, which can be seen in FIG. 2.

In particular, the first side edge 221 of each dragon's tooth 108 may overlap a side edge 122 of a first tab 108 positioned on a first side (e.g., the left side, as shown in FIG. 2) of the corresponding gap 109. This overlap may create a first 131, which is shown in FIG. 1. Similarly, the second side edge 222 of each dragon's tooth 208 may overlap a side edge 121 of a second tab 108 positioned on a second side (e.g., the right side, as shown in FIG. 2) of the corresponding gap 109. As above, this overlap may create a second joint 132, which is also shown in FIG. 1.

In some embodiments as otherwise described herein, the first joint 131 and the second joint 131 between each dragon's tooth 208 and its corresponding gap 209 may be sealed with a laminating adhesive. For instance, the roofing shingle 100 may include a first strip of laminating adhesive, shown by way of example by the dashed line 123 in FIG. 2, that is arranged lengthwise in the overlap of the first joint 131 between each dragon's tooth 108 and the respective first tab 108 on the first side of the corresponding gap 109.

Likewise, the roofing shingle 100 may also include a second strip of laminating adhesive, shown by way of example by the dashed line 124 in FIG. 2, that is arranged lengthwise in the overlap of the second joint 132 between each dragon's tooth 108 and the respective second tab 108 on the second side of the corresponding gap 109.

In some embodiments as otherwise described herein, the overlaps of the first joint 131 and the overlap of the second joint 132 may each have a respective width that is no greater than 1 inch. For instance, the overlap on both sides of the dragon's tooth 208 may be no greater than 0.25 inches, such that the width 211 of each dragon's tooth 208 is a total of 0.5 inches wider than the width 112 of the corresponding gap 109. Accordingly, the first and second strips of laminating adhesive 123 and 124 must be applied within the overlap distance of each joint 131 and 132 on the respective sides of the dragon's tooth 208.

In some implementations, the roofing shingle 100 may also include a third strip of laminating adhesive for each dragon's tooth 108 in the series of dragon's teeth. The third strip of laminating adhesive, shown by way of example by the dashed line 125 in FIG. 2, may be aligned with each respective dragon's tooth 108 and arranged widthwise between the connecting portion 107 of the shim layer 101 and the headlap portion 207 of the top shingle layer 201.

As shown in FIG. 2, the laminating adhesive is shown applied to the top surface 104 of the shim layer 101. In some other implementations, one or more of the strips of laminating adhesive may be applied to a bottom surface of the top shingle layer 201. Further, the strips of laminating adhesive are shown as dashed lines in FIG. 2 for clarify of illustration, to distinguish them from the side edges of each tab 108. This does not necessarily indicate an application pattern for the adhesive. In practice, the laminating adhesive may be applied in a continuous line. Other possibilities also exist.

In certain embodiments as otherwise described herein, the laminating adhesive may be a bituminous or a non-bituminous based adhesive. For example, the laminating adhesive may be a sealant including rubberized additives, polyurethane, epoxy, or a hot melt adhesive, among other possibilities.

As shown in FIG. 2, some embodiments of the roofing shingle 100 may include a shim layer 101 where each tab 108 in the series of tabs 108 has the same width 111. Accordingly, each space 209 in the top shingle layer 201 may also have the same width, which may be slightly smaller than the width 111 of each tab 108. Similarly, each dragon's tooth 208 in the series of dragon's teeth 208 of the top shingle layer 201 may have the same width 211. Accordingly, each gap 109 in the series of gaps 109 of the shim layer 101 may have the same width 112, which as discussed above, may be slightly smaller than the width 211 of the dragon's teeth 208.

However, the widths of both the tabs 108 and the dragon's teeth 208 may be varied, as noted above regarding their respective lengths. For instance, each tab 108 in the series of tabs 108 may include a first width 111 that is different from a second width of at least one adjacent tab 108. The width of each space 209 of the top shingle layer 201 may be correspondingly varied. Similarly, each dragon's tooth 208 in the series of dragon's teeth 208 may include a first width 211 that is different from a second width of at least one adjacent dragon's tooth 208, and the width of each gap 109 of the shim layer 101 may be correspondingly varied.

Figure 4:
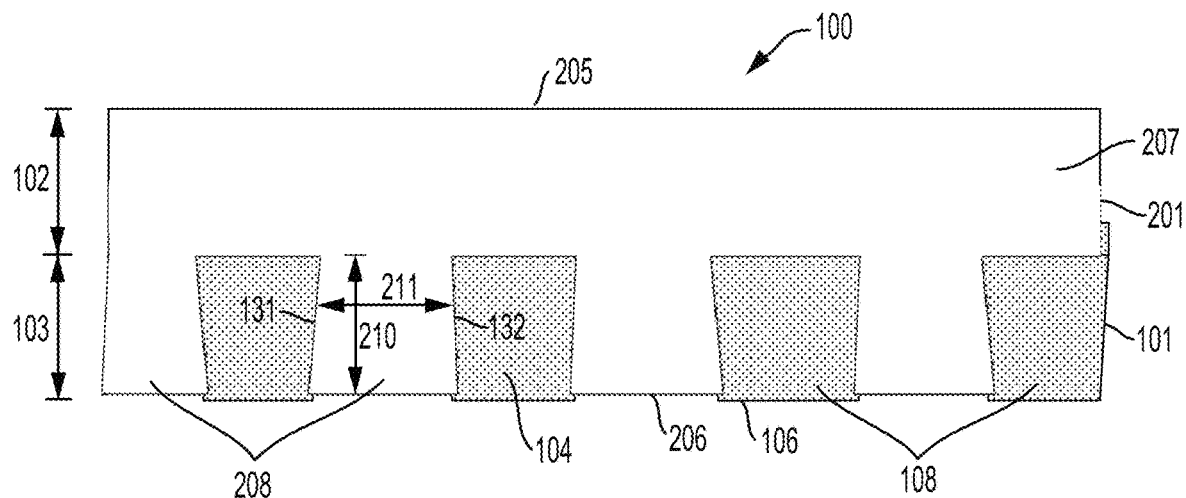
FIG. 4 is a schematic plan view of a roofing shingle according to another embodiment of the disclosure.

Turning now to FIG. 4, another example of a roofing shingle 100 is shown in a different arrangement than that shown in FIG. 1, although most of the features discussed above and shown in FIGS. 1-3 are present. For example, the roofing shingle 100 of FIG. 4 includes a shim layer 101, shown separately in FIG. 5, as well as a top shingle layer 201, shown separately in FIG. 6, that is at least partially laminated to the top surface 104 of the shim layer 101.

In certain embodiments as otherwise described herein, and as shown in FIG. 4, the bottom edge 116 of the connecting portion 107 may be substantially coextensive with the bottom edge 216 of the headlap portion 207 of the top shingle layer 201, such that a shadow line is not included in the roofing shingle 100. Further, and unlike FIG. 1, FIG. 4 illustrates an example of the roofing shingle 100 where the bottom edge 105 of the shim layer 101 extends beyond the bottom edge 206 of the top shingle layer 201.

In some embodiments as otherwise described herein, and as shown in the example roofing shingle 100 shown in FIG. 4, each dragon's tooth 208 in the series of dragon's teeth 208 may include a respective width 211 that decreases from the bottom edge 206 of the top shingle layer 201 toward the headlap portion 207 of the top shingle layer 201. In this arrangement, each ach space 209 between the dragon's teeth 108 may include a respective width that increases from the bottom edge 206 of the top shingle layer 201 toward the headlap portion 207 of the top shingle layer 201.

Figure 5:
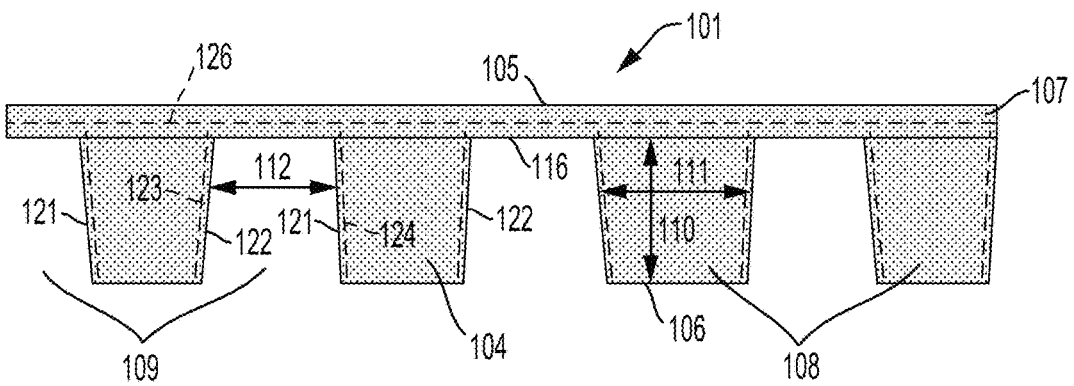
FIG. 5 is a schematic plan view of a shim layer of a roofing shingle according to another embodiment of the disclosure.
Figure 6:
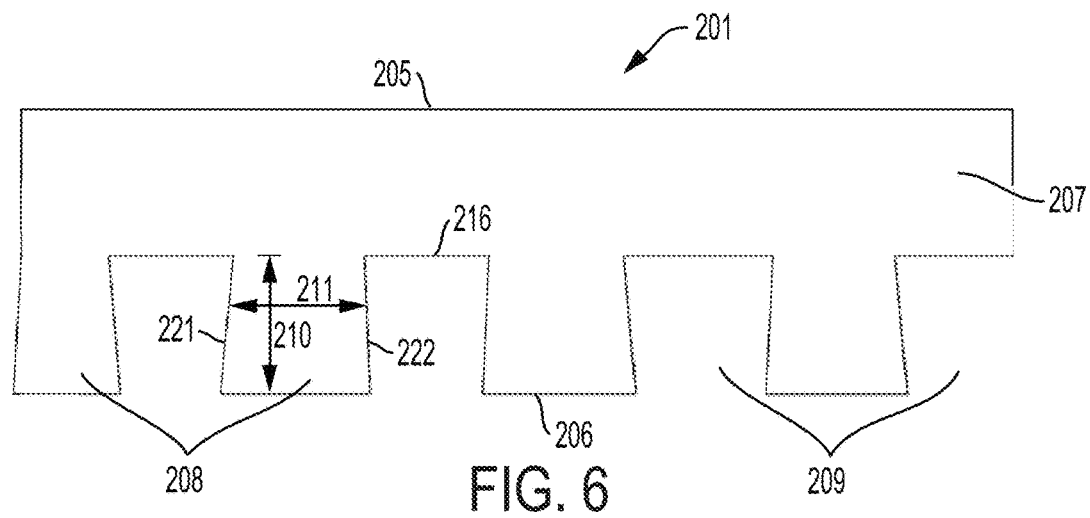
FIG. 6 is a schematic plan view of a top shingle layer of a roofing shingle according to another embodiment of the disclosure.

Similarly, and as shown in FIG. 5, each tab 108 in the series of tabs 108 may include a respective width 111 that increases from the bottom edge 105 of the shim layer 101 toward the connecting portion 107 of the shim layer 101. In this arrangement, each gap 109 may include a respective width 111 that decreases from the bottom edge of the shim layer toward the connecting portion of the shim layer.

As noted above, each dragon's tooth 208 may have a width that differs from at least one of the adjacent dragon's teeth 208. In some implementations, and as shown in the roofing shingle 100 of FIG. 4, the widths 211 or each dragon's tooth 208 may be varied not only in their starting width at the bottom edge 205 of the top shingle layer 201, but also in the angle of one or both sides 221 and 222 of a given dragon's tooth 208. Further, the width 111 of the tabs 108 of the shim layer 101 may be varies in a similar way. As with other examples discussed above, varying the width of the dragon's teeth 208 may provide an irregular pattern that may simulate the appearance of a cedar shake roof, which may be desirable in some cases.

Alternatively, the variable width 211 of the dragon's teeth 208 of the roofing shingle 100 may be the same for each respective dragon's tooth 208. For instance, in an alternative arrangement of the roofing shingle 100 shown in FIG. 4, the width 211 of each dragon's tooth 208 may be the same at the bottom edge 206 of the top shingle layer 201, and then may vary at the same rate toward the headlap portion 207.

In some embodiments as otherwise described herein, rather than the individual strips of laminating adhesive 125 shown in FIG. 2, the roofing shingle 100 may include a continuous strip of laminating adhesive 126 arranged widthwise between the connecting portion 107 of the shim layer 101 and the headlap portion 207 of the top shingle layer 201. Such an arrangement is shown in FIG. 5.

Another embodiment of the disclosure is a roofing shingle system that includes a plurality of roofing shingles, such as the roofing shingle 100 as discussed in the examples above. For example, FIG. 7 shows a schematic plan view of a roofing shingle system 300 according to another embodiment of the disclosure.

For instance, the siding system 300 may include a first plurality of roofing shingles 100 arranged laterally edge to edge to form a first course 120. The first plurality of shingles may include a first roofing shingle 100a and a second roofing shingle 100b, as shown in FIG. 7. For instance, the first roofing shingle 100a and the second roofing shingle 100b may both take the form of the roofing shingle 100 discussed in the examples above.

The roofing shingle system 300 may further include a second plurality of roofing shingles arranged laterally edge to edge to form a second course 220. For example, each roofing shingle in the second plurality of roofing shingles may be the roofing shingle 100 discussed in the examples above. Further, the second course 220 may be positioned such that it overlaps the headlap zones 102 of the first course 120 of roofing shingles. This pattern may then be repeated with a third plurality of roofing shingles arranged in a third course positioned to overlap the headlap zones 302 of the shingles in the second course 220, and so on.

Figure 7:
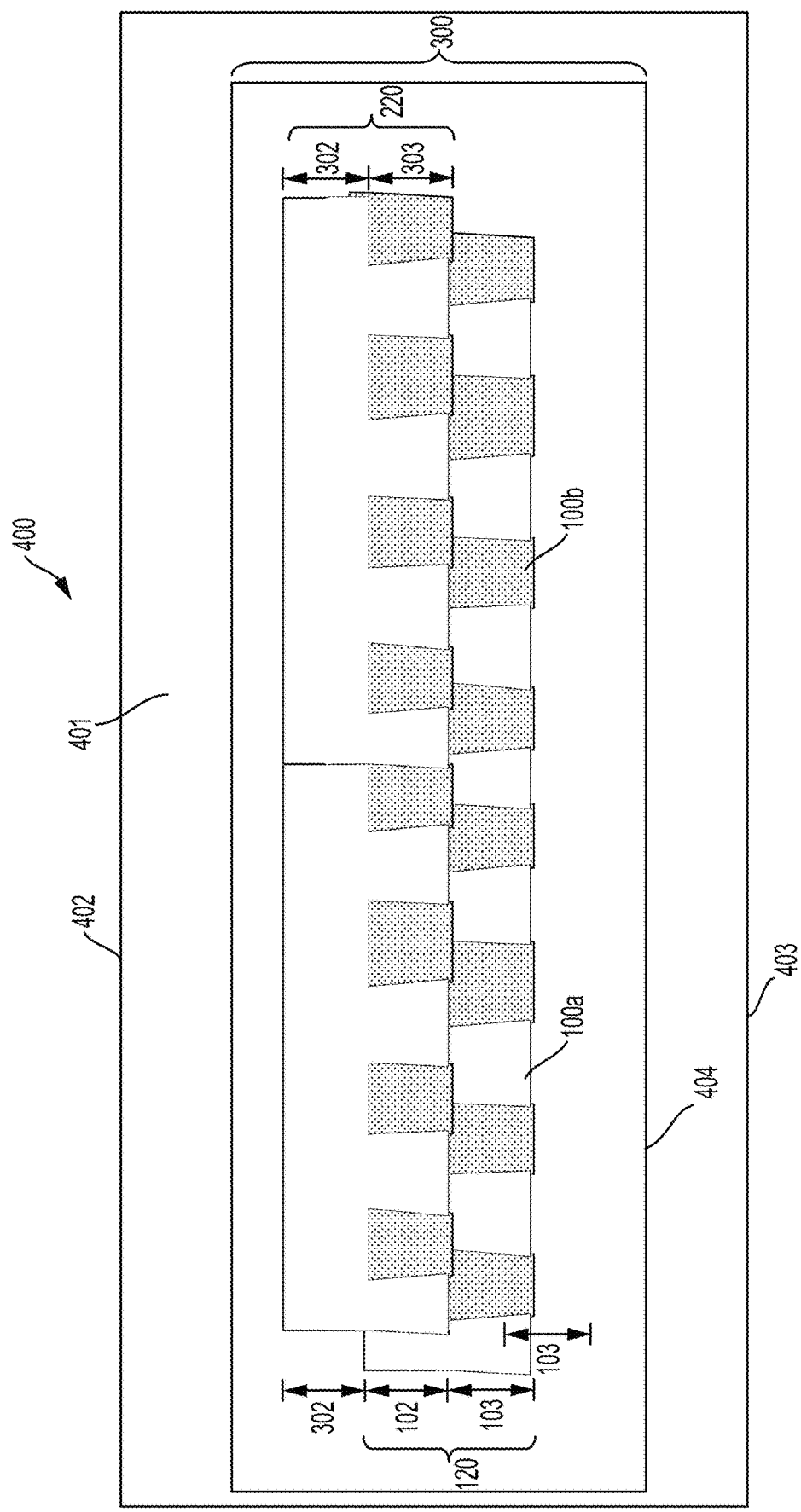
FIG. 7 is a schematic plan view of a roofing shingle system on a roof deck according to another embodiment of the disclosure.
Figure 8:
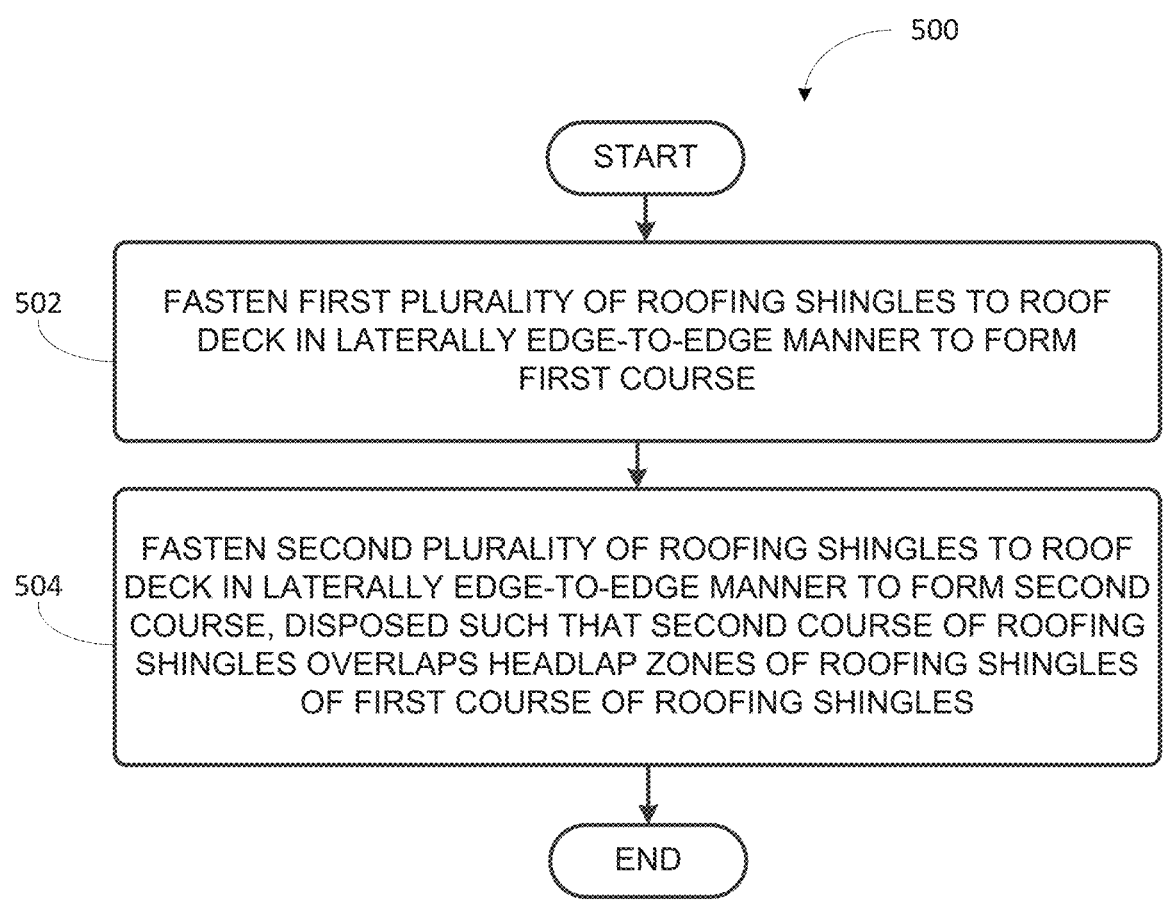
FIG. 8 is a block diagram of a method for installing a roofing shingle system on a roof deck according to another embodiment of the disclosure.

Further, FIG. 7 shows a roof 400 of a structure including a roof deck 401, with the roofing shingle system 300 installed thereon. For instance, the roof deck 401 may include an upper end 402 and a lower end 403. The roofing shingle system 300 may be fastened to the roof deck 401, via fasteners such as nails, with the headlap zones of the roofing shingles disposed toward the upper end 402 of the roof deck 401 and the exposure zones of the roofing shingles being disposed toward the lower end 403 of the roof deck 401.

In some embodiments as otherwise described herein, the roof 400 may include as underlayment a weather resistant barrier 404 positioned between the roof deck 401 and the roofing shingle system 300. In some applications, the weather resistant barrier 404 may be considered a part of the roofing shingle system 300, as indicated in FIG. 7. The weather resistant barrier 404 may be, for example, at least one of a bituminous mat, a woven synthetic mat, or a felt mat. Other underlayment materials are also possible.

Figure 9:
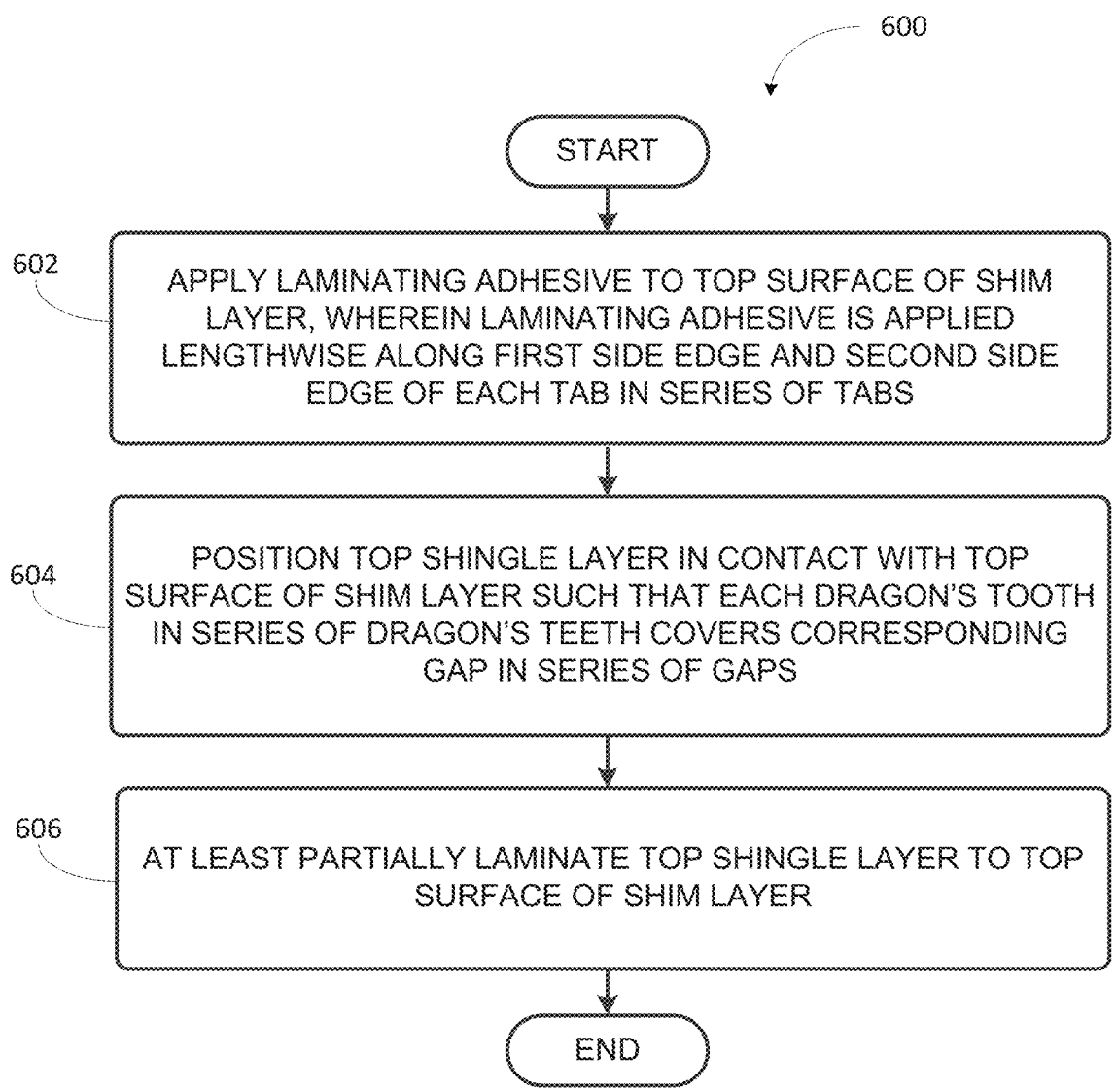
FIG. 9 is a block diagram of a method for making a roofing shingle according to another embodiment of the disclosure.

FIG. 9 is a block diagram of a method 500 for installing a roofing shingle system, such as the roofing shingle system 300, on a roof deck such as the roof deck 401.

At block 502, the method 500 includes fastening the first plurality of the shingles, such as the roofing shingles 100, to the roof deck 401 in a laterally edge-to-edge manner to form a first course, such as the first course 120 shown in FIG. 7. For example, fastening each roofing shingle 100 to the roof deck 401 may include placing a fastener, such as a nail, through the top shingle layer 201 and the shim layer 101, and the weather resistant barrier 404, if present, and into the roof deck 401.

At block 504, the method 500 includes fastening the second plurality of the shingles 100 to the roof deck 401 in a laterally edge-to-edge manner to form a second course, such as the second course 220 shown in FIG. 7. The second plurality of shingles 100 may be disposed such that the second course 220 of roofing shingles 100 overlaps the headlap zones 102 of the roofing shingles 100 of the first course 120 of roofing shingles 100.

FIG. 9 is a block diagram of a method 600 for making roofing shingle, such as the roofing shingle 100, as shown in the Figures and described in the examples above.

At block 602, the method 600 includes applying a laminating adhesive to the top surface 104 of the shim layer 101. For example, as shown in FIGS. 2 and 5, the laminating adhesive may be applied lengthwise along a first side edge 121, such as the strip 123, as well as along a second side edge 122, such as the strip 124, of each tab 108 in the series of tabs 108.

Additionally, and as discussed above, the method 600 may include further include applying the laminating adhesive widthwise in a series of strips 125 within the connecting portion 107 of the shim layer 101, as shown in FIG. 2. Each strip 125 in the series of strips 125 may be aligned with a respective gap 109 in the series of gaps 109. In some other examples, the method 600 may include applying the laminating adhesive widthwise in a continuous strip 126 within the connecting portion 107 of the shim layer 101.

As noted above, the method 600 may alternatively include applying the laminating adhesive to a bottom side of the top shingle layer 201, rather than the top side 104 of the shim layer 101. In some implementations, the laminating adhesive may be applied in part to both shingle layers before they are laminated together.

At block 604, the method 600 includes positioning the top shingle layer 201 in contact with the top surface 104 of the shim layer 101 such that each dragon's tooth 108 in the series of dragon's teeth 108 covers a corresponding gap 109 in the series of gaps 109. For instance, as discussed above, the top shingle layer 201 may be positioned with respect to the shim layer 101 such that a first side 221 and a second side 222 of each dragon's tooth 208 overlap the respective side edges of two adjacent tabs 108 of the shim layer 101, creating a first joint 131 and a second joint 132. The joints may be sealed by the laminating adhesive.

At block 606, the method 500 includes at least partially laminating the top shingle layer 201 to the top surface 104 of the shim layer 101. For example, depending on the type of laminating adhesive that is applied, the roofing shingle 100 may be heated or cured in order to form the bond between the two shingle layers. Other possibilities also exist.

Conventional methodologies for shingle construction can be used in the manufacturing of the roofing shingles as described herein.

Additional aspects of the disclosure are provided by the following enumerated embodiments, which can be combined and permuted in any number and in any combination that is not technically or logically inconsistent Embodiment 1. A roofing shingle having a headlap zone disposed above an exposure zone, the roofing shingle comprising:
  a shim layer having a top edge, a bottom edge disposed in the exposure zone, a top surface, and a connecting portion adjoining the top edge and connecting a series of tabs, wherein the series of tabs includes a series of gaps separating adjacent tabs in the series of tabs, wherein each gap in the series of gaps extends lengthwise from the bottom edge of the shim layer to the connecting portion;
  a top shingle layer at least partially laminated to the top surface of the shim layer, wherein the top shingle layer comprises a top edge disposed in the headlap zone, a bottom edge disposed in the exposure zone, a headlap portion adjoining the top edge and connecting a series of dragon's teeth, wherein the series of dragon's teeth includes a series of spaces separating adjacent dragon's teeth in the series of dragon's teeth, wherein each spaces in the series of spaces extends lengthwise from the bottom edge of the top shingle layer to the headlap portion, and wherein the shim layer and the top shingle layer are aligned such that each dragon's tooth in the series of dragon's teeth covers a corresponding gap in the series of gaps.

Embodiment 2. The roofing shingle of embodiment 1, wherein the bottom edge of the shim layer is substantially coextensive with the bottom edge of the top shingle layer.

Embodiment 3. The roofing shingle of embodiment 1, wherein the bottom edge of the top shingle layer is offset from the bottom edge of the shim layer, e.g., such that the bottom edge of the shim layer extends beyond the bottom edge of the top shingle layer, or such that the bottom edge of the top shingle layer extends beyond the bottom edge of the shim layer.

Embodiment 4. The roofing shingle of any of embodiments 1-3, wherein each tab in the series of tabs comprises the same length.

Embodiment 5. The roofing shingle of any of embodiments 1-4, wherein each tab in the series of tabs comprises a first length that is different from a second length of at least one adjacent tab in the series of tabs.

Embodiment 6. The roofing shingle of any of embodiments 1-5, wherein each dragon's tooth in the series of dragon's teeth comprises the same length.

Embodiment 7. The roofing shingle of any of embodiments 1-5, wherein each dragon's tooth in the series of dragon's teeth comprises a first length that is different from a second length of at least one adjacent dragon's tooth in the series of dragon's teeth.

Embodiment 8. The roofing shingle of any of embodiments 1-7, wherein the connecting portion of the shim layer comprises a bottom edge, wherein the headlap portion of the top shingle layer comprises a bottom edge, and wherein the bottom edge of the connecting portion is substantially coextensive with the bottom edge of the headlap portion of the top shingle layer.

Embodiment 9. The roofing shingle of any of embodiments 1-7, wherein the connecting portion of the shim layer comprises a bottom edge, wherein the headlap portion of the top shingle layer comprises a bottom edge, and wherein the bottom edge of the connecting portion is offset from the bottom edge of the headlap portion of the top shingle layer such that a portion of the connecting portion is exposed.

Embodiment 10. The roofing shingle of any of embodiments 1-9, wherein each dragon's tooth in the series of dragon's teeth comprises a first side edge and a second side edge defining a first width therebetween, wherein the first width that is greater than a second width of the corresponding gap.

Embodiment 11. The roofing shingle of embodiment 10, wherein the first side edge of each dragon's tooth overlaps a side edge of a first tab positioned on a first side of the corresponding gap creating a first joint, and wherein the second side edge of each dragon's tooth overlaps a side edge of a second tab positioned on a second side of the corresponding gap creating a second joint.

Embodiment 12. The roofing shingle of embodiment 11, wherein the roofing shingle further comprises a first strip of laminating adhesive arranged lengthwise in the overlap of the first joint between each dragon's tooth and the respective first tab on the first side of the corresponding gap, and wherein the roofing shingle further comprises a second strip of laminating adhesive arranged lengthwise in the overlap of the second joint between each dragon's tooth and the respective second tab on the second side of the corresponding gap.

Embodiment 13. The roofing shingle of any of embodiments 11-12, wherein the overlap of the first joint and the overlap of the second joint each comprise a respective width no greater than 1 inch, e.g., no greater than 0.5 inches, or no greater than 0.25 inches.

Embodiment 14. The roofing shingle of any of embodiments 11-13, wherein, for each dragon's tooth in the series of dragon's teeth, the roofing shingle further comprises a third strip of laminating adhesive, aligned with each dragon's tooth and arranged widthwise between the connecting portion of the shim layer and the headlap portion of the top shingle layer.

Embodiment 15. The roofing shingle of any of embodiments 11-13, wherein the roofing shingle further comprises a continuous strip of laminating adhesive arranged widthwise between the connecting portion of the shim layer and the headlap portion of the top shingle layer.

Embodiment 16. The roofing shingle of any of embodiments 12-15, wherein the laminating adhesive comprises a bituminous or a non-bituminous based adhesive, e.g., a sealant comprising rubberized additives, polyurethane, epoxy, or a hot melt adhesive.

Embodiment 17. The roofing shingle of any of embodiments 1-16, wherein the shim layer and the top shingle layer are formed from the same material.

Embodiment 18. The roofing shingle of any of embodiments 1-17, wherein the shim layer has a thickness that is equal to a thickness of the top shingle layer.

Embodiment 19. The roofing shingle of any of embodiments 1-18, wherein thickness of the shim layer and the top shingle layer are each ¼ of an inch or less, e.g., ⅛ of an inch or less, or 1/16 of an inch or less.

Embodiment 20. The roofing shingle of any of embodiments 1-19, each tab in the series of tabs comprises the same width.

Embodiment 21. The roofing shingle of any of embodiments 1-19, wherein each tab in the series of tabs comprises a first width that is different from a second width of at least one adjacent tab.

Embodiment 22. The roofing shingle of any of embodiments 1-21, wherein each dragon's tooth in the series of dragon's teeth comprises the same width.

Embodiment 23. The roofing shingle of any of embodiments 1-21, wherein each dragon's tooth in the series of dragon's teeth comprises a first width that is different from a second width of at least one adjacent dragon's tooth.

Embodiment 24. The roofing shingle of any of embodiments 1-23, wherein each dragon's tooth in the series of dragon's teeth comprises a respective width that decreases from the bottom edge of the top shingle layer toward the headlap portion of the top shingle layer, such that each space comprises a respective width that increases from the bottom edge of the top shingle layer toward the headlap portion of the top shingle layer.

Embodiment 25. The roofing shingle of any of embodiments 1-24, wherein each tab in the series of tabs comprises a respective width that increases from the bottom edge of the shim layer toward the connecting portion of the shim layer, such that each gap comprises a respective width that decreases from the bottom edge of the shim layer toward the connecting portion of the shim layer.

Embodiment 26. A roofing shingle system comprising:
  a first plurality of roofing shingles of any of embodiments 1-25, wherein the first plurality of roofing shingles are arranged laterally edge to edge to form a first course; and
  a second plurality of roofing shingles of any of embodiments 1-25, wherein the second plurality of roofing shingles are arranged laterally edge to edge to form a second course, wherein the second course of roofing shingles overlaps the headlap zones of the shingles of the first course of roofing shingles.

Embodiment 27. A roof comprising a roof deck having an upper end and a lower end, and the roofing shingle system of embodiment 26 fastened thereto, wherein the headlap zones of the roofing shingles are disposed toward the upper end of the roof deck and the exposure zones of the roofing shingles are disposed toward the lower end of the roof deck.

Embodiment 28. The roof of embodiment 27, further comprising a weather resistant barrier layer positioned between the roof deck and the roofing shingle system.

Embodiment 29. The roof of embodiment 28, wherein the weather resistant barrier comprises at least one of a bituminous mat, a woven synthetic mat, or a felt mat.

Embodiment 30. A method for installing a roof according to any of embodiments 27-29, the method comprising:
  fastening the first plurality of the roofing shingles to the roof deck in a laterally edge-to-edge manner to form a first course, and
  fastening the second plurality of the roofing shingles to the roof deck in a laterally edge-to-edge manner to form a second course, disposed such that the second course of roofing shingles overlaps the headlap zones of the roofing shingles of the first course of roofing shingles.

Embodiment 31. The method of embodiment 30, wherein fastening each roofing shingle to the roof deck comprises placing a fastener through the shim layer and the top shingle layer, and into the roof deck.

Embodiment 32. A method for making a roofing shingle according to any of embodiments 1-25, the method comprising:
  applying a laminating adhesive to the top surface of the shim layer, wherein the laminating adhesive is applied lengthwise along a first side edge and a second side edge of each tab in the series of tabs;
  positioning the top shingle layer in contact with the top surface of the shim layer such that each dragon's tooth in the series of dragon's teeth covers a corresponding gap in the series of gaps; and at least partially laminating the top shingle layer to the top surface of the shim layer.

Embodiment 33. The method of embodiment 32, wherein the laminating adhesive is further applied widthwise in a series of strips within the connecting portion of the shim layer, wherein each strip in the series of strips is aligned with a respective gap in the series of gaps.

Embodiment 34. The method of embodiment 32, wherein the laminating adhesive is further applied widthwise in a continuous strip within the connecting portion of the shim layer.

It will be apparent to those skilled in the art that various modifications and variations can be made to the processes and devices described here without departing from the scope of the disclosure. Thus, it is intended that the present disclosure cover such modifications and variations of this invention provided they come within the scope of the appended claims and their equivalents.

What is claimed is:

1. A roofing shingle having a headlap zone disposed above an exposure zone, the roofing shingle comprising only two bituminous-coated mats, the two bituminous-coated mats being:
a shim layer having a top edge, a bottom edge disposed in the exposure zone, a top surface, and a connecting portion adjoining the top edge and connecting a series of tabs, wherein the series of tabs includes a series of gaps separating adjacent tabs in the series of tabs, wherein each gap in the series of gaps extends lengthwise from the bottom edge of the shim layer to the connecting portion; and
a top shingle layer at least partially laminated to the top surface of the shim layer, wherein the top shingle layer comprises a top edge disposed in the headlap zone, a bottom edge disposed in the exposure zone, a headlap portion adjoining the top edge and connecting a series of dragon's teeth, wherein the series of dragon's teeth includes a series of spaces separating adjacent dragon's teeth in the series of dragon's teeth, wherein each spaces in the series of spaces extends lengthwise from the bottom edge of the top shingle layer to the headlap portion, and wherein the shim layer and the top shingle layer are aligned such that each dragon's tooth in the series of dragon's teeth covers a corresponding gap in the series of gaps.

2. The roofing shingle of claim 1, wherein the bottom edge of the shim layer is substantially coextensive with the bottom edge of the top shingle layer.

3. The roofing shingle of claim 1, wherein the bottom edge of the top shingle layer is offset from the bottom edge of the shim layer, such that the bottom edge of the shim layer extends beyond the bottom edge of the top shingle layer, or such that the bottom edge of the top shingle layer extends beyond the bottom edge of the shim layer.

4. The roofing shingle of claim 1, wherein each tab in the series of tabs has the same length.

5. The roofing shingle of claim 1, wherein each tab in the series of tabs has a first length that is different from a second length of at least one adjacent tab in the series of tabs.

6. The roofing shingle of claim 1, wherein each dragon's tooth in the series of dragon's teeth has a first length that is different from a second length of at least one adjacent dragon's tooth in the series of dragon's teeth.

7. The roofing shingle of claim 1, wherein the connecting portion of the shim layer comprises a bottom edge, wherein the headlap portion of the top shingle layer comprises a bottom edge, and wherein the bottom edge of the connecting portion is substantially coextensive with the bottom edge of the headlap portion of the top shingle layer.

8. The roofing shingle of claim 1, wherein the connecting portion of the shim layer comprises a bottom edge, wherein the headlap portion of the top shingle layer comprises a bottom edge, and wherein the bottom edge of the connecting portion is offset from the bottom edge of the headlap portion of the top shingle layer such that a portion of the connecting portion is exposed.

9. The roofing shingle of claim 1, wherein each dragon's tooth in the series of dragon's teeth comprises a first side edge and a second side edge defining a first width therebetween, wherein the first width that is greater than a second width of the corresponding gap.

10. The roofing shingle of claim 9, wherein the first side edge of each dragon's tooth overlaps a side edge of a first tab positioned on a first side of the corresponding gap creating a first joint, and wherein the second side edge of each dragon's tooth overlaps a side edge of a second tab positioned on a second side of the corresponding gap creating a second joint, and wherein the roofing shingle further comprises a first strip of laminating adhesive arranged lengthwise in the overlap of the first joint between each dragon's tooth and the respective first tab on the first side of the corresponding gap, and wherein the roofing shingle further comprises a second strip of laminating adhesive arranged lengthwise in the overlap of the second joint between each dragon's tooth and the respective second tab on the second side of the corresponding gap.

11. The roofing shingle of claim 10, wherein the overlap of the first joint and the overlap of the second joint each has a respective width no greater than 1 inch, e.g., no greater than 0.5 inches, or no greater than 0.25 inches.

12. The roofing shingle of claim 10, wherein, for each dragon's tooth in the series of dragon's teeth, the roofing shingle further comprises a third strip of laminating adhesive, aligned with each dragon's tooth and arranged widthwise between the connecting portion of the shim layer and the headlap portion of the top shingle layer.

13. The roofing shingle of claim 1, wherein each dragon's tooth in the series of dragon's teeth has the same width.

14. The roofing shingle of claim 1, wherein each dragon's tooth in the series of dragon's teeth has a first width that is different from a second width of at least one adjacent dragon's tooth.

15. The roofing shingle of claim 1, wherein each dragon's tooth in the series of dragon's teeth has a respective width that decreases from the bottom edge of the top shingle layer toward the headlap portion of the top shingle layer, such that each space comprises a respective width that increases from the bottom edge of the top shingle layer toward the headlap portion of the top shingle layer.

16. The roofing shingle of claim 1, wherein each tab in the series of tabs has a respective width that increases from the bottom edge of the shim layer toward the connecting portion of the shim layer, such that each gap comprises a respective width that decreases from the bottom edge of the shim layer toward the connecting portion of the shim layer.

17. A roofing shingle system comprising:
a first plurality of roofing shingles and a second plurality of roofing shingles each according to claim 1,
wherein the first plurality of roofing shingles are arranged laterally edge to edge to form a first course; and
wherein the second plurality of roofing shingles are arranged laterally edge to edge to form a second course, wherein the second course of roofing shingles overlaps the headlap zones of the shingles of the first course of roofing shingles.

18. A roof comprising a roof deck having an upper end and a lower end, and the roofing shingle system of claim 17 fastened thereto, wherein the headlap zones of the roofing shingles are disposed toward the upper end of the roof deck and the exposure zones of the roofing shingles are disposed toward the lower end of the roof deck.

19. A method for installing a roof according to claim 18, the method comprising:
fastening the first plurality of the roofing shingles to the roof deck in a laterally edge-to-edge manner to form a first course, and
fastening the second plurality of the roofing shingles to the roof deck in a laterally edge-to-edge manner to form a second course, disposed such that the second course of roofing shingles overlaps the headlap zones of the roofing shingles of the first course of roofing shingles.

20. A method for making a roofing shingle according to claim 1, the method comprising:

applying a laminating adhesive to the top surface of the shim layer, wherein the laminating adhesive is applied lengthwise along a first side edge and a second side edge of each tab in the series of tabs;

positioning the top shingle layer in contact with the top surface of the shim layer such that each dragon's tooth in the series of dragon's teeth covers a corresponding gap in the series of gaps; and at least partially laminating the top shingle layer to the top surface of the shim layer, wherein the laminating adhesive is further applied widthwise in a series of strips within the connecting portion of the shim layer, wherein each strip in the series of strips is aligned with a respective gap in the series of gaps.

21. The roofing shingle of claim 1, wherein the roofing shingle further comprises a continuous strip of laminating adhesive arranged widthwise between the connecting portion of the shim layer and the headlap portion of the top shingle layer.

\* \* \* \* \*